(12) United States Patent
Kwa et al.

(10) Patent No.: US 11,314,310 B2
(45) Date of Patent: Apr. 26, 2022

(54) CO-EXISTENCE OF FULL FRAME AND PARTIAL FRAME IDLE IMAGE UPDATES

(71) Applicant: INTEL CORPORATION, Santa Clara, CA (US)

(72) Inventors: Seh Kwa, Saratoga, CA (US); Nausheen Ansari, Folsom, CA (US); Sameer Kp, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 465 days.

(21) Appl. No.: 15/858,055

(22) Filed: Dec. 29, 2017

(65) Prior Publication Data

US 2019/0041955 A1 Feb. 7, 2019

(51) Int. Cl.
| | |
|---|---|
| *G06F 1/32* | (2019.01) |
| *G09G 5/393* | (2006.01) |
| *G06F 1/3218* | (2019.01) |
| *G06F 1/3234* | (2019.01) |
| *G09G 5/36* | (2006.01) |
| *G09G 5/395* | (2006.01) |

(52) U.S. Cl.
CPC .......... *G06F 1/3218* (2013.01); *G06F 1/3234* (2013.01); *G06F 1/3265* (2013.01); *G09G 5/363* (2013.01); *G09G 5/393* (2013.01); *G09G 5/395* (2013.01); *G09G 2330/021* (2013.01); *G09G 2330/022* (2013.01); *G09G 2340/0435* (2013.01); *G09G 2360/12* (2013.01); *G09G 2360/18* (2013.01)

(58) Field of Classification Search
CPC .................................... G06F 1/32; G06F 1/26
See application file for complete search history.

(56) References Cited

U.S. PATENT DOCUMENTS

| | | | | |
|---|---|---|---|---|
| 2003/0118112 | A1* | 6/2003 | Son ..................... | H04N 19/61 375/240.25 |
| 2005/0071702 | A1* | 3/2005 | Morisawa ............. | G06F 1/3203 713/320 |
| 2006/0001614 | A1* | 1/2006 | Hsueh .................. | G09G 3/3258 345/76 |
| 2006/0250339 | A1* | 11/2006 | Kim ...................... | G09G 3/3406 345/87 |
| 2007/0002036 | A1* | 1/2007 | Kardach ................ | G09G 5/006 345/213 |
| 2007/0109292 | A1* | 5/2007 | Dahan ................... | G09G 5/363 345/211 |
| 2008/0186319 | A1* | 8/2008 | Boner ................... | G09G 5/393 345/545 |
| 2009/0160541 | A1* | 6/2009 | Liu ....................... | G06F 1/3228 327/544 |
| 2009/0237384 | A1* | 9/2009 | Hu ........................ | G06F 1/3218 345/211 |
| 2010/0281277 | A1* | 11/2010 | Qin ....................... | G06F 1/3203 713/300 |

(Continued)

*Primary Examiner* — Phil K Nguyen
(74) *Attorney, Agent, or Firm* — Alliance IP, LLC (57) ABSTRACT

Disclosed herein are techniques to coordinate power management between a platform and a panel. Provided are apparatuses, techniques, and circuitry to determine whether to initiate power management features in a panel and send a signal from a platform to the panel including an indication that no frame updates are expected and power management functions can be initiated.

16 Claims, 6 Drawing Sheets

(56) References Cited

U.S. PATENT DOCUMENTS

| | | | | |
|---|---|---|---|---|
| 2011/0063333 A1* | 3/2011 | Chiou | ............... | G09G 3/2092 |
| | | | | 345/690 |
| 2011/0221757 A1* | 9/2011 | Hsieh | ............... | G09G 3/2096 |
| | | | | 345/522 |
| 2012/0075188 A1* | 3/2012 | Kwa | ............... | G09G 3/2096 |
| | | | | 345/168 |
| 2012/0262627 A1* | 10/2012 | Cho | ............... | G09G 5/006 |
| | | | | 348/540 |
| 2013/0054998 A1* | 2/2013 | Wyatt | ............... | G06F 1/3265 |
| | | | | 713/323 |
| 2013/0235055 A1* | 9/2013 | Kim | ............... | G09G 5/006 |
| | | | | 345/545 |
| 2014/0232870 A1* | 8/2014 | Mon | ............... | H04N 7/01 |
| | | | | 348/148 |
| 2014/0337649 A1* | 11/2014 | Biswas | ............... | G06F 1/3218 |
| | | | | 713/323 |
| 2015/0234449 A1* | 8/2015 | Khan | ............... | G06F 1/329 |
| | | | | 713/324 |
| 2016/0267883 A1* | 9/2016 | Bibikar | ............... | G09G 5/36 |
| 2018/0040306 A1* | 2/2018 | Arumugam | ............... | G09G 5/393 |
| 2019/0087144 A1* | 3/2019 | Yadav | ............... | G06F 3/147 |
| 2019/0373423 A1* | 12/2019 | Li | ............... | H04W 4/20 |

\* cited by examiner

CO-EXISTENCE OF FULL FRAME AND PARTIAL FRAME IDLE IMAGE UPDATES

TECHNICAL FIELD

Embodiments described herein generally relate to refreshing display panels and particularly to refreshing images displayed on panels with partial and full frame updates.

BACKGROUND

Display panels include memory that stores, for each pixel, the color to be displayed. Pixel memory retention times are on the order of tens to hundreds of milliseconds. However, an image may remain on the screen for viewing over an extended viewing period on the order of tens or hundreds of seconds, if not minutes. Thus, the pixel memory is periodically refreshed at what is known as a refresh rate.

Modern display panels typically include frame buffers, which are integrated into the display panel and provide memory retention to allow for the panel to "self-refresh." Self-refresh techniques provide a significant boost to energy efficiency of display devices.

DETAILED DESCRIPTION

The present disclosure is generally directed to optimizing display device self-refresh modes based on full frame idle images, new full frame updates and partial frame updates. Self-refresh techniques can provide for savings in power consumption, particularly when dealing with full frame idle images. However, display image updates are not always full images and often, the image update intervals are not synchronized with frame update intervals. For example, a user's interaction with a display system is arbitrary and not often synchronized with frame update intervals. Thus, display panels are required to continuously monitor for image (both full and partial) updates, which can erode the power reduction benefits of these self-refresh techniques.

Provided herein are systems, display panel and source circuitry, and techniques to provide notification to display modules of the transitions between full frame idle images, new full frame updates and partial frame updates. This disclosure provides advantages over prior techniques in that power optimizations (e.g., power management of unused display electronics and/or circuitry, reducing refresh rate in the display module, etc.) can be implemented without relying on control from image source circuitry. This provides a latent advantage in that suppliers can independently test features (e.g., refresh rate changes, etc.) and therefore make product line decisions without being tightly coupled with image source circuitry suppliers.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
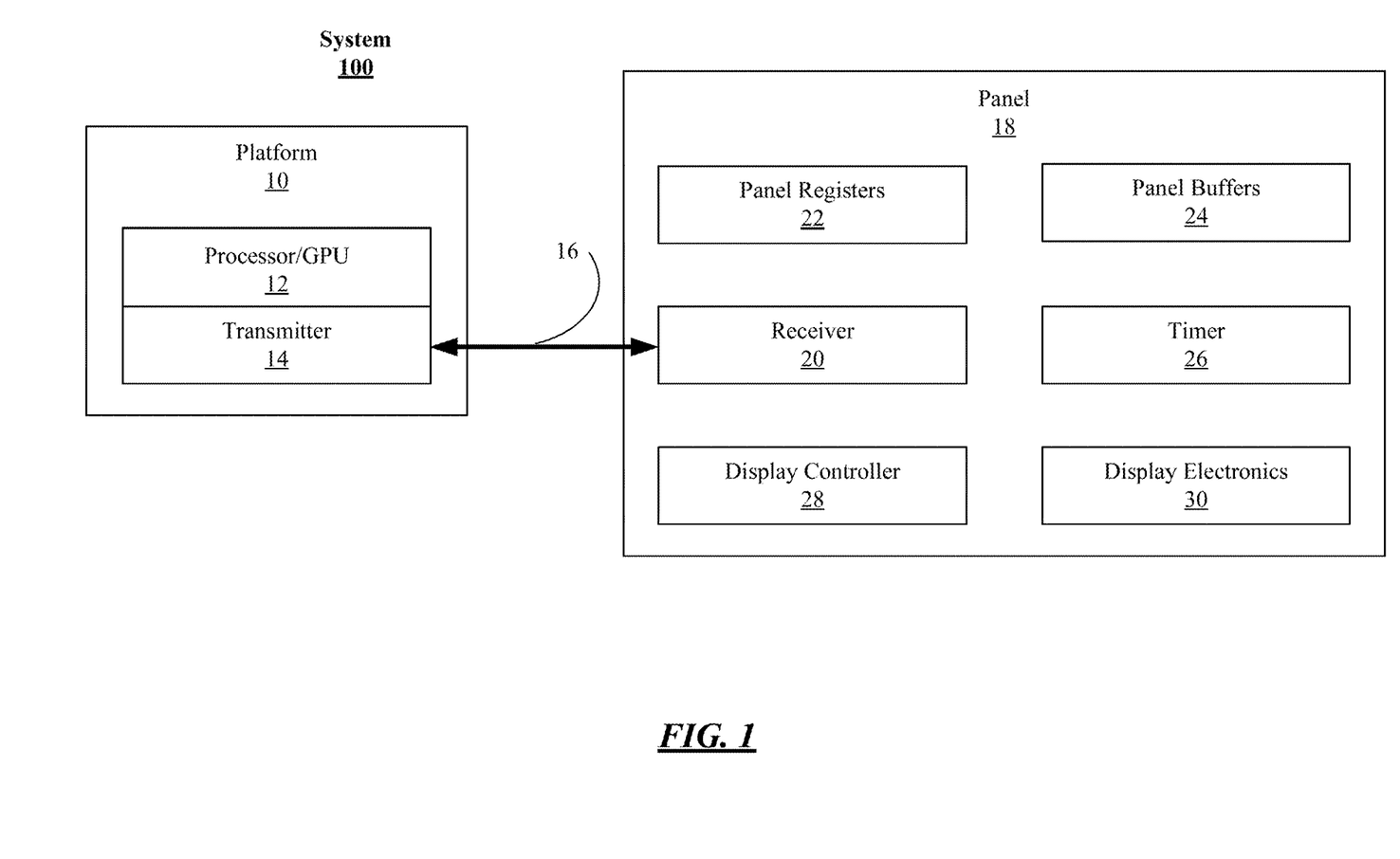
FIG. 1 illustrates an embodiment of a display system.

FIG. 1 illustrates a display system 100, arranged according to at least one embodiment of the disclosure. As depicted, the display system 100 includes a platform 10 and a panel 18 coupled by a display interface 16. In general, the platform 10 can comprise any platform arranged to generate images to be displayed by the panel 18. For example, the platform 10 could be integrated into, part of, or comprise, a laptop computer, a desktop computer, an ultrabook, a cellular telephone, or any processor-based device. In general, panel 18 can be integrated into, part of, or comprise, any of a variety of displays, such as, light emitting diode (LED) displays, organic LED (OLED) displays, liquid crystal displays (LCD), or the like. Display interface 16 may be any of a variety of display interfaces, such as, for example, a display port interface, an embedded display port interface, a high-definition multimedia interface (HDMI), or the like.

The platform 10 may have a processing unit 12, which can be a conventional processor, a graphics processing unit (GPU) or a combination of conventional processor and GPU. Platform 10 further includes a transmitter 14. Processor 12 and transmitter 14 may constitutes a display engine. Platform 10 may be provided as a System-on-Chip (SoC), such as may be integrated into a display system device (e.g., mobile phone, laptop, portable media device, etc.). In general, platform 10 sends images for display by panel 10 via display interface 16. For example, platform 10 can send, via transmitter 14 and display interface 16, information elements including indications of pixel data (e.g., color, locations, etc.) generated by GPU 12 to panel 18. Such information elements (or "frames") often sent at intervals corresponding to a frame rate of panel 18. This is described in greater detail below.

Panel 18 may include a receiver 20, panel registers 22, panel buffers 24, timer 26, display controller 28 and display electronics 30. In general, panel 18 can receive frames (e.g., from platform) at receiver 20 via display interface 16. Receiver 20 can provide the frames to display controller 28, which in turn, provides the frames for display on display electronics 28. Receiver 20 and/or display electronics may have access to panel registers 22, which may store indications of settings for panel 18 (e.g., refresh rate, etc.). Timer 24 can be coupled to receiver 20 and/or display controller 28 and can operate to provide an expiration of a frame refresh interval, or expiation of a period where the display interface 16 link is shut down to conserve power, for example, when the panel 18 is operating in a self-refresh mode, sometimes referred to as panel self-refresh (PSR).

Panel buffer 24 provides memory storage for frames received via display interface 16. Display controller 28 can operate to shut down portions of panel (e.g., receiver, or the like) during periods of PSR and can refresh display electronics from indications of the frame stored in panel buffers 24.

During operation, the transmitter 14 and receiver 20 can be arranged to coordinate PSR and/or shutting down display interface 16. As provided herein, such coordination can include coordinating frame updates between the source (e.g., platform 10) and the sink (e.g., panel 18).

Figure 2:
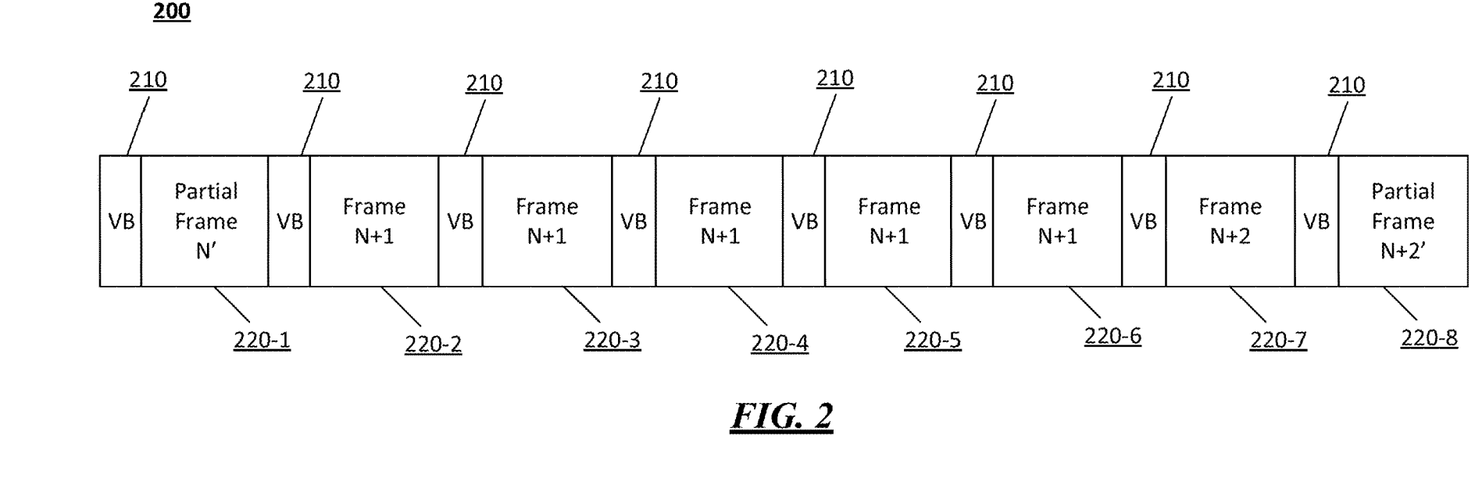
FIG. 2 illustrates a first frame update schedule.

FIG. 2 illustrates an example frame update schedule 200. As depicted, the frame update schedule 200 illustrates continuous updates between platform 10 and panel 18. It is to be appreciated, that vertical blanking (VB) intervals 210 are disposed between each frame. VB intervals 210 indicate an end of the last line of a frame and the beginning of the first line of the next frame. Frame update schedule 200 further includes frames 220. It is noted that eight (8) frames are depicted in this figure for purposes of clarity, specifically, frames 220-1, 220-2, 220-3, 220-4, 220-5, 220-6, 220-7 and 220-8. However, schedule 200 could include any number of frames 220 without departing from the spirit and scope of the disclosure. It is further noted, that frames 220-2 to 220-6 are identical. More particularly, where a frame is labeled with the same identification (e.g., "Frame N+1") it indicates the frames are identical in term of pixel content even though the timestamps might be different. Additionally, where a frame is labelled with an apostrophe at the end (e.g., "Partial Frame N'") it indicates only a portion of the frame content has changed and it is appropriate to use a partial update mechanism to update the frame.

Figure 3:
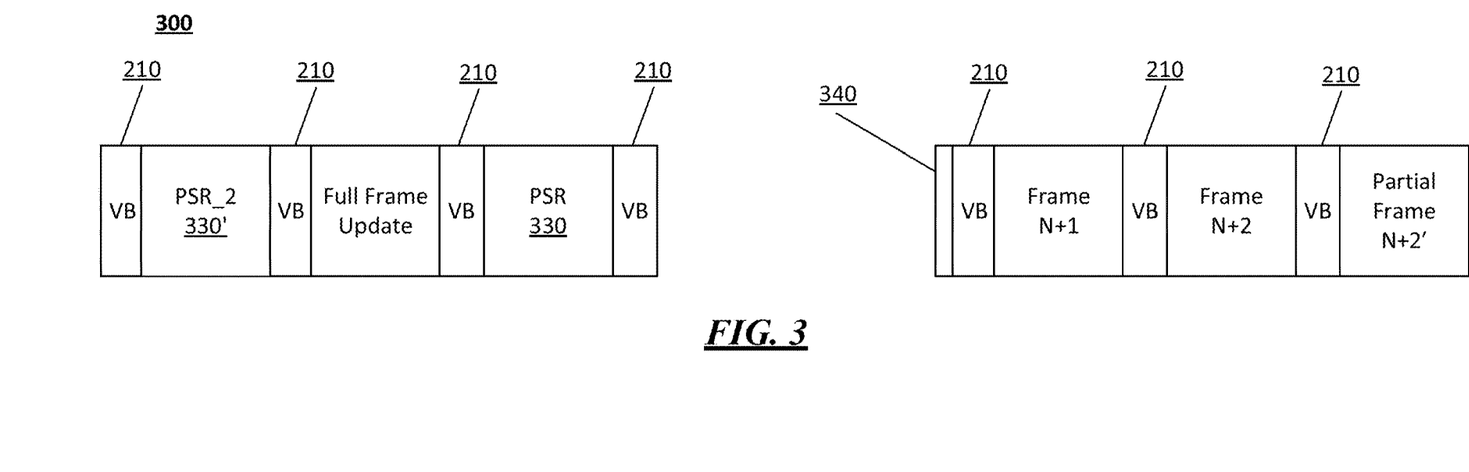
FIG. 3 illustrates a second frame update schedule.

The frame update schedule 200 depicts typical streaming of frames from a source (e.g., platform 10) to a sink (e.g., panel 18) without panel self-refresh. FIG. 3 illustrates an example frame update schedule 300, arranged according to some examples of the present disclosure. Schedule 300 illustrates an example where the source (e.g., platform 10) and sink (e.g., panel 18) coordinate handling of full frame updates, partial frame updates and no frame updates to provide optimizations for PSR as detailed herein. Such optimizations can facilitate the panel entering a deeper sleep or lower power state than conventional systems and the update schedule is coordinated between the source (e.g., platform 10) and sink (e.g., panel 18).

Schedule 300, like schedule 200, includes VB intervals 210 disposed between frames 220. However, as depicted, schedule 300 includes a PSR interval 330 and a retraining interval 340. In general, schedule 300 can provide a full frame update for frame 220-2. Panel 18 can store frame N+1 for PSR interval. For example, panel buffers 24 can store frame N+1, which display controller 28 can use to refresh display electronics 30 during PSR interval 330. Additionally, schedule 300 includes a partial PSR interval PSR 330'. PSR 330' could correspond to a selective update process, for example, to update partial frame N'.

Panel 18 can be arranged to resynchronize with platform 10 during retraining intervals 340. Said differently, receiver 20 and/or display controller 28 can be powered up and remain in full frame update mode for a selected number of frames (e.g., as specified in panel registers 22, or the like) before resuming with power management functions such as PSR 330 or PSR_2 330'. Furthermore, receiver and/or display controller 28 can be arranged to power down for a selected number of frames (e.g., as specified in panel registered 22, or the like) during PSR 300 or PSR_2 330'.

Figure 4:
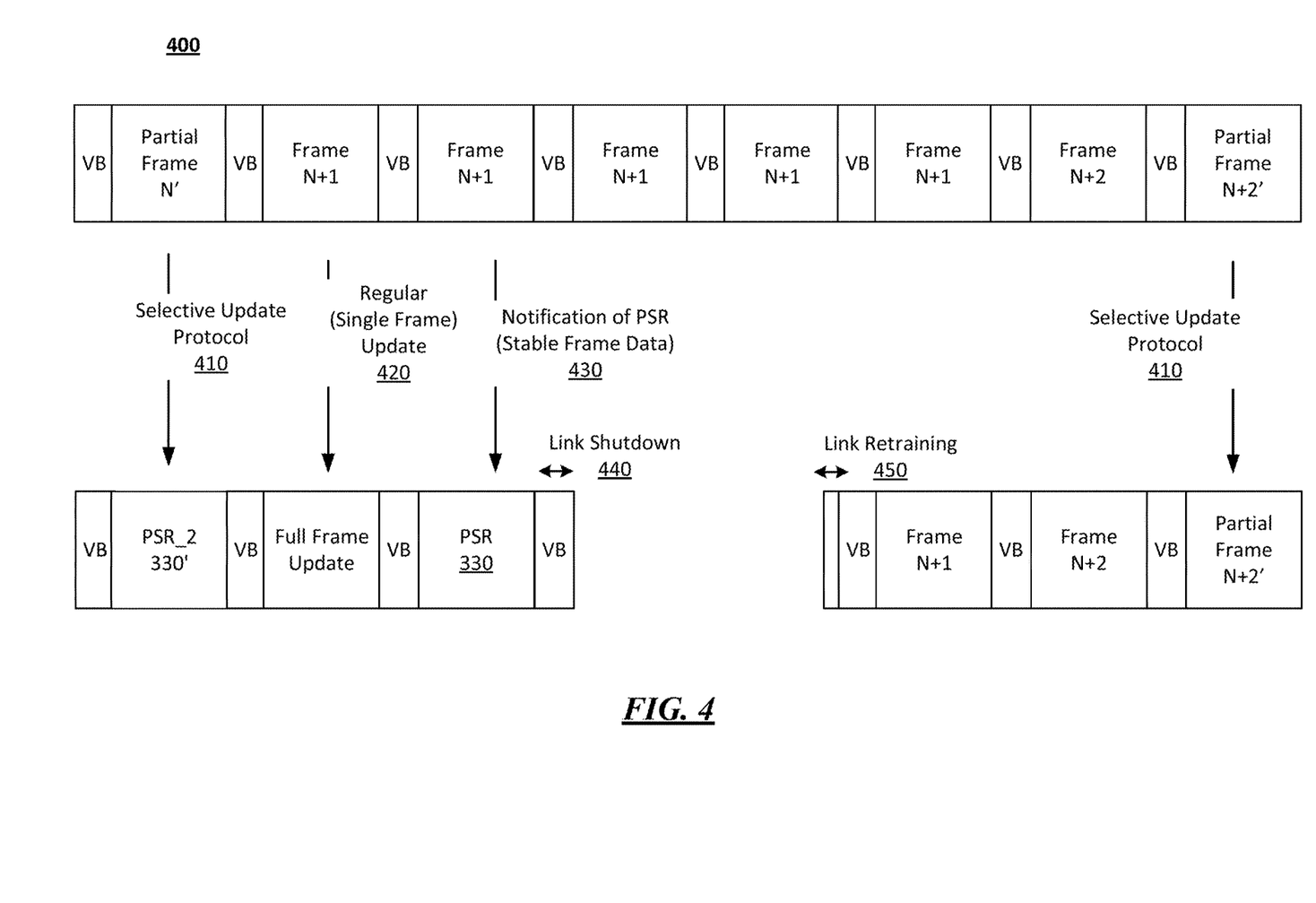
FIG. 4 illustrates a technique.

FIG. 4 illustrates an example technique 400 to coordinate updates between source and sink devices in a display systems, such as, for example, platform 10 and panel 18. The technique 400 is depicted in conjunction with schedules 200 and 300 to illustrate coordination of updates for full frame and partial frame updates as well as to coordinate link shutdown. As depicted in this figure, technique 400 can include platform 10 initiating a selective update protocol with panel 18 to cause panel 18 to partially refresh a displayed image using partial frame N'. For example, platform 10 could implement selective update at block 410 in accordance with the Embedded Display Port (eDP) Standard v 1.4, published in February 2015 and promulgated by the Video Electronics Standards Association (VESA).

Platform 10 can provide a regular, or single frame update, at block 420. Subsequently, platform 10 can request or initiate PSR at block 430. Specifically, at block 430, the platform can indicate to the panel that stable frame data is expected. In response, the panel 18 can enter PSR at block 440. For example, the panel 18 can shut down the link 16 and/or other electronics within the panel, such as, for example, the receiver 20. It is important to note, that the PSR is enabled in response to the platform indicating stable frame data is expected. This is different than conventional system where the panel determines that stable frames have been received and enters PSR.

At block 450, the panel 18 can exit PSR and retrain the link 16. In some examples, the panel 18 can stay in PSR for a selected number of frames (e.g., 2 frames in this example). Upon exiting from PSR, panel 18 may be required to remain in full, or regular, frame update mode for a selected number of frames. This number of frames can be specified, for example, within panel registers, or the like.

In general, the platform 10 can indicate to the panel 18 that no frame updates (full, partial, etc.) are expected using any of a variety of techniques. In response, the panel 18 can enter PSR and apply power management functions (e.g., clock gating components within the panel 18, applying selective refresh rate reduction, etc.).

With some examples, the platform 10 can indicate to the panel 18 that no frame updates are expected via a sideband interconnect or side band interface. For example, in many applications link 16 may include side band channels that couple platform 10 and panel 18. Platform 10 could send an indication (e.g., a control signal, an information element, or the like) via this side band channel. As a specific example, platform 10 can indicate to panel via a level-sensitive or edge-sensitive side band channel in link 16 that no frame updates are expected.

In some examples, the platform 10 can indicate to the panel 18 that no frame updates are expected via an existing configuration channel within link 16. For example, display port links include an AUX channel, which the platform 10 could use to indicate (e.g., via a control signal, via an information element, or the like) to the panel 18 that no frame updates are expected.

With some examples, the platform 10 can indicate to the panel 18 that no frame updates are expected by tagging an indicator onto a packet sent between the platform 10 and the panel 18 via link 16. For example, platform 10 may append a selected character or symbol onto a packet at each frame boundary to indicate to the panel 18 whether future frame updates are expected. In response, panel 18 may determine whether to enter PSR as discussed herein. As a specific example, platform 10 can employ the secondary data packet mechanism provided by the Embedded Display Port (eDP) Standard v 1.4, published in February 2015 and promulgated by the Video Electronics Standards Association (VESA) to indicate to the panel that no frame updates are expected.

Figure 5:
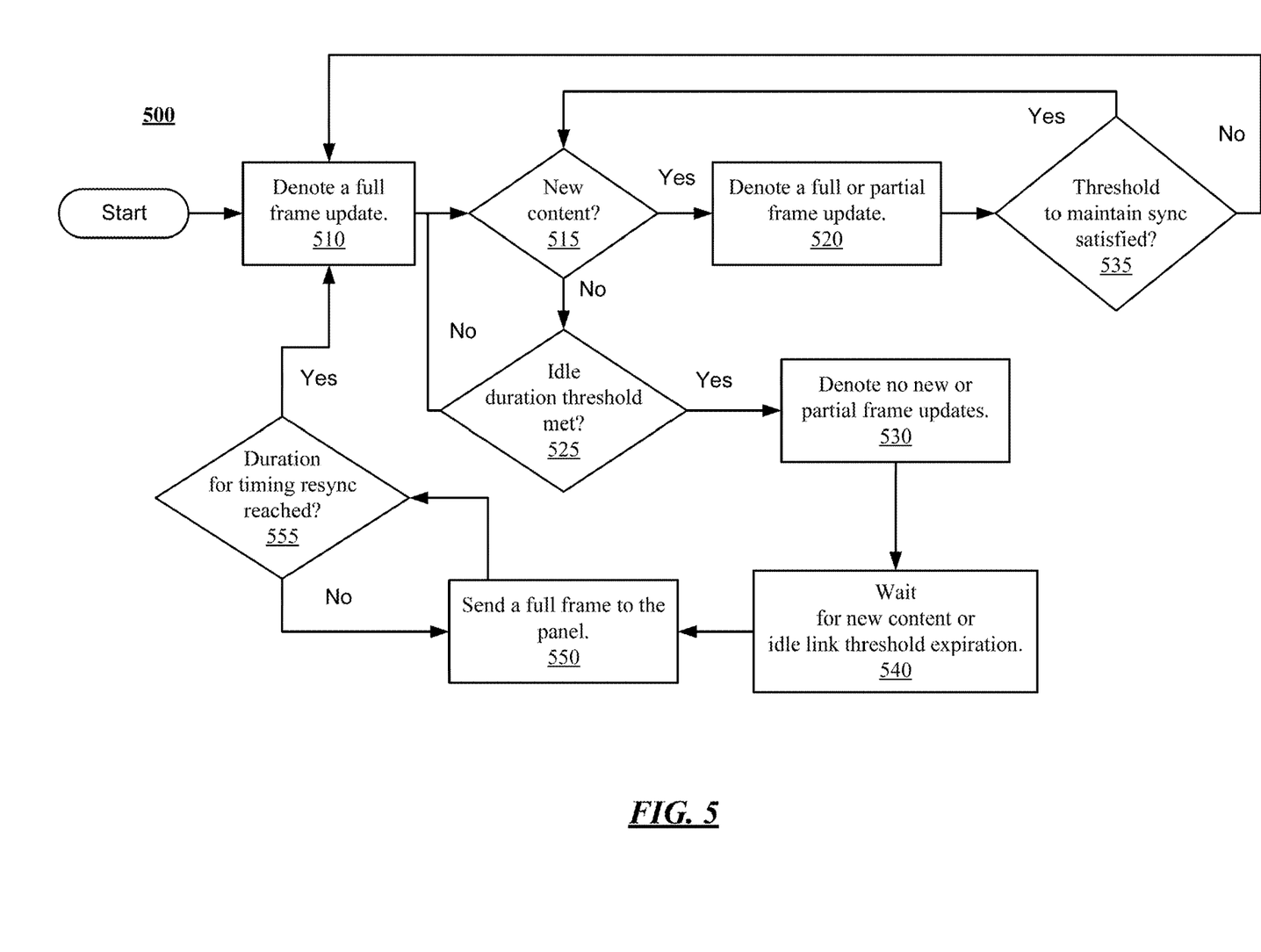
FIG. 5 illustrates a logic flow.

FIG. 5 illustrates a logic flow 500 for classifying a frame and indicating to a panel that no frame updates are expected. Logic flow 500 can be implemented by a platform coupled to a panel, such as, for example, platform 10 coupled to panel 18. Logic flow 500 can begin at block 510. At block 510 "denote a full frame update" a full frame update can be denoted. For example, the platform 10 can send a full frame update to the panel 18. Continuing to decision block 515 "new content" the platform can determine whether the following frame (or frames) includes new content. For example, the platform 10 can determine whether the next frame is a partial frame update or a full frame update, or no frame update. From decision block 515, logic flow 500 can continue to either block 520 or decision block 525. For example, logic flow 500 can continue from decision block 515 to block 520 based on a determination that the next frame does include new content. Conversely, logic flow 500 can continue from decision block 515 to decision block 525 based on a determination that the next frame does not include new content.

At block 520 "denote a full or partial frame update" a full or partial frame update can be denoted. For example, platform 10 can denote a full frame update to panel 18 where the new content includes an entirely new frame. Similarly, platform 10 can denote a partial frame update to panel 18 where the new content includes partial frame updates. At decision block 525 "idle duration threshold reached?" platform 10 can determine whether an idle duration threshold has been reached. Said differently, platform 10 can determine whether no new content (e.g., based on decision block 515) has been received in a selected period of time (e.g., 1 frame, 2 frames, 3 frames, 4 frames, etc.).

From block 520, logic flow 500 can continue to decision block 535. At decision block 535 "threshold to maintain sync satisfied?" platform 10 can determine whether a sync maintenance threshold has been reached. For example, in some implementations (e.g., as indicated in FIGS. 3-4) the platform 10 may be required to update the panel 18 with a selected number of frames (e.g., 2 frames, 3 frames, 4 frames, or the like) in order to establish and/or maintain a synchronization between the platform 10 and the panel 18.

From decision block 535, logic flow 500 can return to either block 510 or decision block 515. For example, logic flow 500 can continue from decision block 535 to block 510 based on a determination that the sync maintenance threshold has not been reached. Conversely, logic flow 500 can continue from decision block 535 to decision block 515 based on a determination that the sync maintenance threshold has been reached.

From decision block 525, logic flow 500 can either return to decision block 515 or continue to block 530. For example, logic flow 500 can continue from decision block 525 to block 530 based on a determination that idle duration threshold has been met. Conversely, logic flow 500 can proceed from decision block 525 to decision block 515 based on a determination that the idle duration threshold has not been met.

At block 530 "denote no new or partial frame updates" platform 10 can indicate that no new or partial frame updates are expected. For example, platform 10 can send an indication to panel 18 (e.g., via a sideband channel, via an out of band channel, via an in-band channel, via appending a character to a frame, or the like) that no new frame updates are expected.

Continuing to block 540 "wait for new content or idle link threshold expiration" platform 10 can wait for new content or an idle link threshold to expire. For example, platform 10 can determine at block 540 that new content (e.g., full frame or partial frame update) has been received. Additionally, at block 540, platform 10 can determine that an idle link threshold duration has expired. For example, in some embodiments, the platform 10 and the panel 18 may be arranged to coordinate an idle link period (e.g., 2 frames, 3 frames, 4 frames, or the like) in which once the platform 10 send an indication that no frame updates are expected, the platform 10 will send a new update at the expiration of this known idle link threshold. As such, coordination between the platform 10 and the panel 18 as to when updates will be sent once PSR has been initiated can be achieved. This idle link threshold can be programmed at initialization, for example, within panel registers 22, or the like.

Continuing from block 540 to block 550 "send a full frame to the panel" the platform 10 can send a full frame update to the panel 18. Continuing to decision block 555 "duration for timing resync reached?" the platform 10 can determine whether a timing resynchronization duration has been reached. For example, in some implementations, the platform 10 and panel 18 need to exchange a set number of full frames to resynchronize timing between controllers. At decision block 555, platform 10 can determine whether this period has been reached. From decision block 555, logic flow 500 can return to either block 550 or block 510. For example, logic flow 500 can continue from decision block 555 to block 510 based on a determination that the duration for timing resync has been reached. Conversely, logic flow 500 can continue from decision block 555 to block 550 based on a determination that the duration for timing resync has not been reached.

Figure 6:
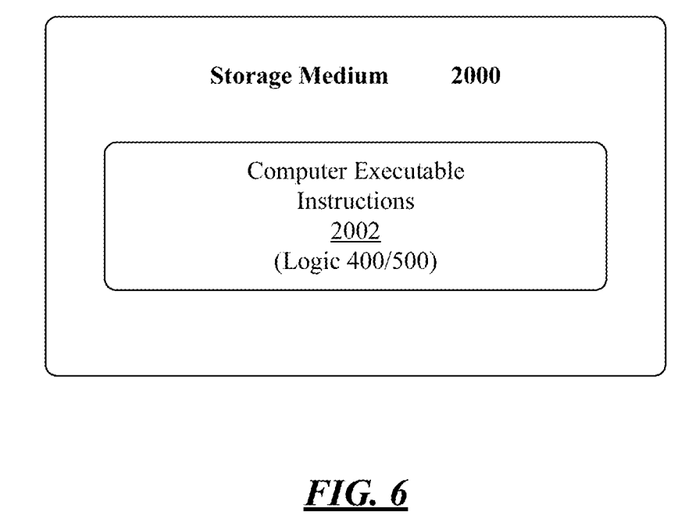
FIG. 6 illustrates one embodiment of a storage medium.

FIG. 6 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement technique 400. In some examples, the storage medium 2000 may store various types of computer executable instructions to implement logic flow 500.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
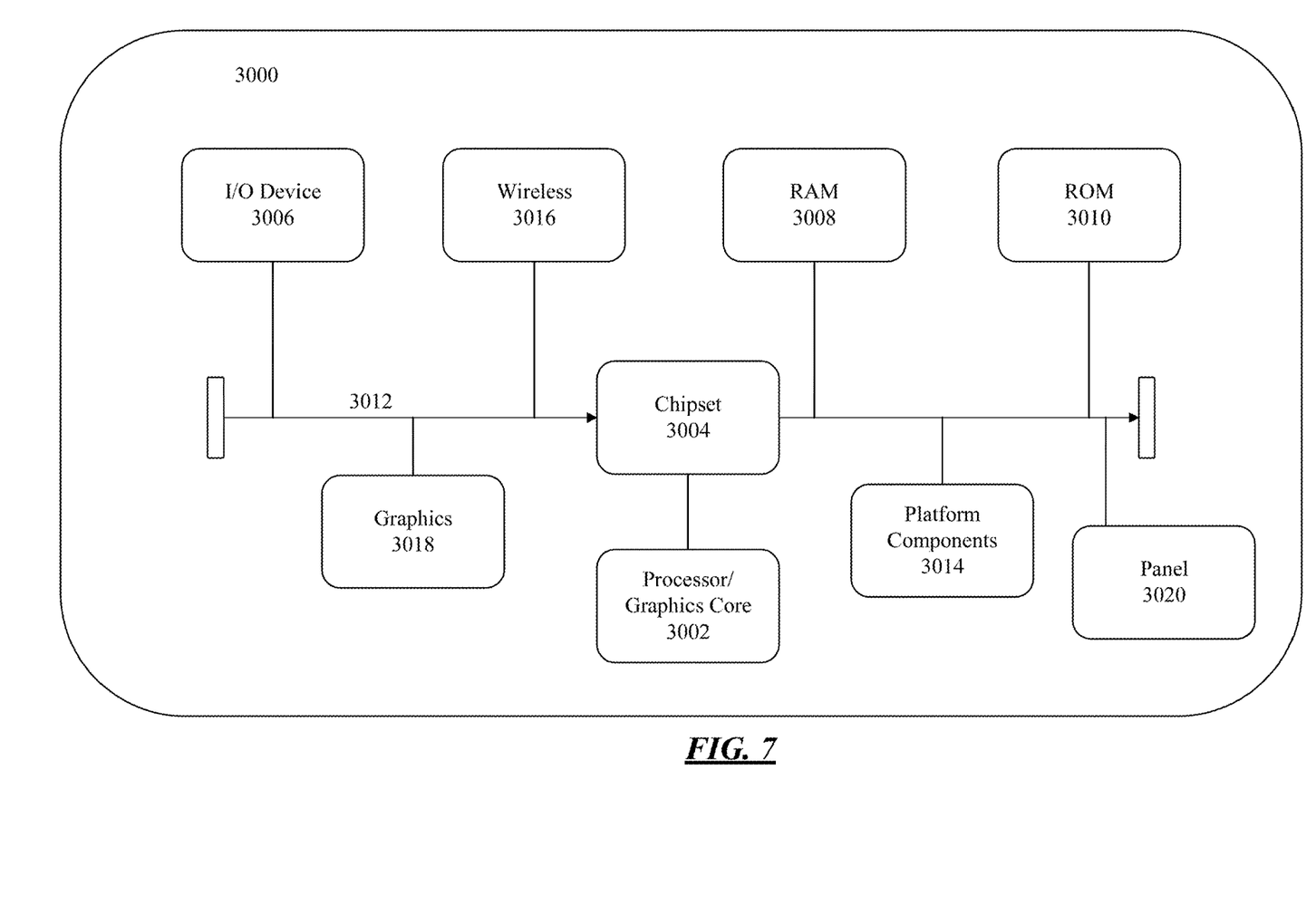
FIG. 7 illustrates one embodiment of a device.

FIG. 12 is a diagram of an exemplary system embodiment and in particular, depicts a platform 3000, which may include various elements. For instance, this figure depicts that platform (system) 3000 may include a processor/graphics core 3002, a chipset 3004, an input/output (I/O) device 3006, a random access memory (RAM) (such as dynamic RAM (DRAM)) 3008, and a read only memory (ROM) 3010, panel 3020 (e.g., panel 18, or the like) and various other platform components 3014 (e.g., a fan, a cross flow blower, a heat sink, DTM system, cooling system, housing, vents, and so forth). System 3000 may also include wireless communications chip 3016 and graphics device 3018. The embodiments, however, are not limited to these elements.

As depicted, I/O device 3006, RAM 3008, and ROM 3010 are coupled to processor 3002 by way of chipset 3004. Chipset 3004 may be coupled to processor 3002 by a bus 3012. Accordingly, bus 3012 may include multiple lines.

Processor 3002 may be a central processing unit comprising one or more processor cores and may include any number of processors having any number of processor cores.

The processor 3002 may include any type of processing unit, such as, for example, CPU, multi-processing unit, a reduced instruction set computer (RISC), a processor that has a pipeline, a complex instruction set computer (CISC), digital signal processor (DSP), and so forth. In some embodiments, processor 3002 may be multiple separate processors located on separate integrated circuit chips. In some embodiments processor 3002 may be a processor having integrated graphics, while in other embodiments processor 3002 may be a graphics core or cores.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the Plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

EXAMPLE 1

An apparatus, comprising: a transmitter to send a frame to a panel via a display interconnect; and a processor coupled to the transmitter, the processor to: determine to initiate power management functions within the panel; and cause the transmitter to send an indication to the panel to cause the panel to initiate power management functions.

EXAMPLE 2

The apparatus of example 1, the processor to: determine whether a full or a partial frame update is to be sent to the panel; determine to initiate power management functions within the panel based on a determination that a full or a partial frame update is not to be sent to the panel.

EXAMPLE 3

The apparatus of example 2, the processor to: determine whether an idle duration threshold has been met; and determine to initiate power management functions within the panel based on a determination that an idle duration threshold has been met.

EXAMPLE 4

The apparatus of example 1, the transmitter coupled to the panel via a sideband channel, the transmitter to send a control signal to the panel via the sideband channel, the control signal to cause the panel to initiate power management functions.

EXAMPLE 5

The apparatus of example 1, the transmitter to send a control signal to the panel via an auxiliary channel within the display interconnect, the control signal to cause the panel to initiate power management functions.

EXAMPLE 6

The apparatus of example 1, the processor to append a character onto a frame to be sent, by the transmitter, to the panel, the character to indicate to the panel to initiate power management functions.

EXAMPLE 7

The apparatus of example 6, the processor to append the character onto the frame in accordance with the secondary data packet mechanism provided by the Embedded Display Port (eDP) Standard v 1.4, published in February 2015 and promulgated by the Video Electronics Standards Association (VESA).

EXAMPLE 8

The apparatus of example 1, comprising a display interface coupled to the transmitter, the display interface to couple to the display interconnect.

EXAMPLE 9

The apparatus of example 8, the display interface comprising a display port interface or an embedded display port interface.

EXAMPLE 10

A method comprising: determining, by a processor in a platform coupled to a panel via a display interconnect, to initiate power management functions within a panel; and sending, from the transmitter, an indication to the panel to cause the panel to initiate power management functions.

EXAMPLE 11

The method of example 10, comprising: determining whether a full or a partial frame update is to be sent to the panel; determining to initiate power management functions within the panel based on a determination that a full or a partial frame update is not to be sent to the panel.

EXAMPLE 12

The method of example 11, comprising: determining whether an idle duration threshold has been met; and determining to initiate power management functions within the panel based on a determination that an idle duration threshold has been met.

EXAMPLE 13

The method of example 10, the transmitter coupled to the panel via a sideband channel, the method comprising sending, by the transmitter, a control signal to the panel via the sideband channel, the control signal to cause the panel to initiate power management functions.

EXAMPLE 14

The method of example 10, comprising sending, by the transmitter, a control signal to the panel via an auxiliary channel within the display interconnect, the control signal to cause the panel to initiate power management functions.

EXAMPLE 15

The method of example 10, comprising appending, by the processor, a character onto a frame to be sent by the transmitter to the panel, the character to indicate to the panel to initiate power management functions.

EXAMPLE 16

The method of example 15, comprising appending the character onto the frame in accordance with the secondary data packet mechanism provided by the Embedded Display Port (eDP) Standard v 1.4, published in February 2015 and promulgated by the Video Electronics Standards Association (VESA).

EXAMPLE 17

The method of example 10, the display interconnect comprising a display port interconnect or an embedded display port interconnect.

EXAMPLE 18

At least one machine-readable storage medium comprising instructions that when executed by a processor at a platform coupled to a panel via a display interconnect, cause the processor to: determine to initiate power management functions within a panel; and cause a transmitter to send to the panel, via the display interconnect, an indication to the panel to cause the panel to initiate power management functions.

EXAMPLE 19

The at least one machine-readable storage medium of example 18, comprising instructions that further cause the processor to: determine whether a full or a partial frame update is to be sent to the panel; determine to initiate power management functions within the panel based on a determination that a full or a partial frame update is not to be sent to the panel.

EXAMPLE 20

The at least one machine-readable storage medium of example 19, comprising instructions that further cause the processor to: determine whether an idle duration threshold has been met; and determine to initiate power management functions within the panel based on a determination that an idle duration threshold has been met.

EXAMPLE 21

The at least one machine-readable storage medium of example 18, comprising instructions that further cause the processor to cause the transmitter to send a control signal to the panel via a sideband channel, the control signal to cause the panel to initiate power management functions, the transmitter coupled to the panel via the sideband channel.

EXAMPLE 22

The at least one machine-readable storage medium of example 18, comprising instructions that further cause the processor to cause the transmitter to send a control signal to the panel via an auxiliary channel within the display interconnect, the control signal to cause the panel to initiate power management functions.

EXAMPLE 23

The at least one machine-readable storage medium of example 18, comprising instructions that further cause the processor to append a character onto a frame to be sent by the transmitter to the panel, the character to indicate to the panel to initiate power management functions.

EXAMPLE 24

The at least one machine-readable storage medium of example 23, comprising instructions that further cause the processor to append the character onto the frame in accordance with the secondary data packet mechanism provided by the Embedded Display Port (eDP) Standard v 1.4, published in February 2015 and promulgated by the Video Electronics Standards Association (VESA).

EXAMPLE 25

The at least one machine-readable storage medium of example 18, the display interconnect comprising a display port interconnect or an embedded display port interconnect.

EXAMPLE 26

An apparatus, comprising: a receiver, at a panel, to receive a frame from a platform via a display interconnect; and a processor coupled to the receiver, the processor to: receive a control signal, from the platform, including an indication to initiate power management functions at the panel; and cause power management functions to be initiated.

EXAMPLE 27

The apparatus of example 26, the receiver coupled to the platform via a sideband channel, the receiver to receive the control signal via the sideband channel.

EXAMPLE 28

The apparatus of example 26, the receiver to receive the control signal via an auxiliary channel within the display interconnect.

EXAMPLE 29

The apparatus of example 26, the control signal comprising a frame including a character appended onto the frame, the character to indicate to the panel to initiate power management functions.

EXAMPLE 30

The apparatus of example 29, the character appended onto the frame in accordance with the secondary data packet mechanism provided by the Embedded Display Port (eDP) Standard v 1.4, published in February 2015 and promulgated by the Video Electronics Standards Association (VESA).

EXAMPLE 31

The apparatus of example 26, comprising a display interface coupled to the receiver, the display interface to couple to the display interconnect.

EXAMPLE 32

The apparatus of example 31, the display interface comprising a display port interface or an embedded display port interface.

EXAMPLE 33

A method comprising: receiving a control signal, from the platform, including an indication to initiate power management functions at the panel; and causing power management functions to be initiated.

EXAMPLE 34

The method of example 33, the receiver coupled to the platform via a sideband channel, the method comprising receiving the control signal via the sideband channel.

EXAMPLE 35

The method of example 33, comprising receiving the control signal via an auxiliary channel within the display interconnect.

EXAMPLE 36

The method of example 33, the control signal comprising a frame including a character appended onto the frame, the character to indicate to the panel to initiate power management functions.

EXAMPLE 37

The method of example 36, the character appended onto the frame in accordance with the secondary data packet mechanism provided by the Embedded Display Port (eDP) Standard v 1.4, published in February 2015 and promulgated by the Video Electronics Standards Association (VESA).

EXAMPLE 38

The method of example 33, the display interface comprising a display port interface or an embedded display port interface.

EXAMPLE 39

At least one machine-readable storage medium comprising instructions that when executed by a processor at a panel coupled to a platform via a display interconnect, cause the processor to: receive a control signal, from the platform, including an indication to initiate power management functions at the panel; and cause power management functions to be initiated.

EXAMPLE 40

The at least one machine-readable storage medium of example 39, the receiver coupled to the platform via a sideband channel, the at least medium comprising instructions that further cause the processor to receive the control signal via the sideband channel.

EXAMPLE 41

The at least one machine-readable storage medium of example 39, comprising instructions that further cause the processor to receive the control signal via an auxiliary channel within the display interconnect.

EXAMPLE 42

The at least one machine-readable storage medium of example 39, the control signal comprising a frame including a character appended onto the frame, the character to indicate to the panel to initiate power management functions.

EXAMPLE 43

The at least one machine-readable storage medium of example 42, the character appended onto the frame in accordance with the secondary data packet mechanism provided by the Embedded Display Port (eDP) Standard v 1.4, published in February 2015 and promulgated by the Video Electronics Standards Association (VESA).

EXAMPLE 44

The at least one machine-readable storage medium of example 39, the display interface comprising a display port interface or an embedded display port interface.

EXAMPLE 45

An apparatus comprising: means, in a platform coupled to a panel via a display interconnect, to determine to initiate power management functions within a panel; and means to send, from the transmitter, an indication to the panel to cause the panel to initiate power management functions.

EXAMPLE 46

The apparatus of example 45, comprising: means to determine whether a full or a partial frame update is to be sent to the panel; means to determine to initiate power management functions within the panel based on a determination that a full or a partial frame update is not to be sent to the panel.

EXAMPLE 47

The apparatus of example 46, comprising: means to determine whether an idle duration threshold has been met; and means to determine to initiate power management functions within the panel based on a determination that an idle duration threshold has been met.

EXAMPLE 48

The apparatus of example 45, the panel coupled to the platform via a sideband channel, the apparatus comprising means to send a control signal to the panel via the sideband channel, the control signal to cause the panel to initiate power management functions.

EXAMPLE 49

The apparatus of example 45, comprising means to send a control signal to the panel via an auxiliary channel within the display interconnect, the control signal to cause the panel to initiate power management functions.

EXAMPLE 50

The apparatus of example 45, comprising means to append a character onto a frame to be sent by the transmitter to the panel, the character to indicate to the panel to initiate power management functions.

EXAMPLE 51

The apparatus of example 50, comprising means to append the character onto the frame in accordance with the secondary data packet mechanism provided by the Embedded Display Port (eDP) Standard v 1.4, published in February 2015 and promulgated by the Video Electronics Standards Association (VESA).

EXAMPLE 52

The apparatus of example 45, the display interconnect comprising a display port interconnect or an embedded display port interconnect.

EXAMPLE 53

An apparatus comprising: means, at a panel, to receive a control signal from a platform, the control signal including an indication to initiate power management functions at the panel; and means to cause power management functions to be initiated.

EXAMPLE 54

The apparatus of example 53, the panel coupled to the platform via a sideband channel, the apparatus comprising means to receive the control signal via the sideband channel.

EXAMPLE 55

The apparatus of example 53, comprising means to receive the control signal via an auxiliary channel within the display interconnect.

EXAMPLE 56

The apparatus of example 53, the control signal comprising a frame including a character appended onto the frame, the character to indicate to the panel to initiate power management functions.

EXAMPLE 57

The apparatus of example 36, the character appended onto the frame in accordance with the secondary data packet mechanism provided by the Embedded Display Port (eDP) Standard v 1.4, published in February 2015 and promulgated by the Video Electronics Standards Association (VESA).

EXAMPLE 58

The apparatus of example 33, the display interface comprising a display port interface or an embedded display port interface.

EXAMPLE 59

A system comprising: the apparatus of any one of examples 1 to 10; and the apparatus of any one of examples 26 to 32.

The invention claimed is:
1. An apparatus, comprising:
   a transmitter to send a frame to a panel via a display interconnect; and
   a processor coupled to the transmitter, the processor to:
     determine whether a full or partial frame update is to be sent to the panel;
     determine to initiate power management functions within the panel based on a determination that a full or partial frame update is not to be sent to the panel; and
     append a character onto a frame to be sent, by the transmitter, to the panel, the character to indicate to the panel to initiate a power management function comprising at least powering down a display interconnect link within the panel.
2. The apparatus of claim 1, the transmitter coupled to the panel via a sideband channel, the transmitter to send a control signal to the panel via the sideband channel, the control signal to cause the panel to initiate power management functions.
3. The apparatus of claim 1, the transmitter to send a control signal to the panel via an auxiliary channel within the display interconnect, the control signal to cause the panel to initiate power management functions.

4. The apparatus of claim 1, comprising a display interface coupled to the transmitter, the display interface to couple to the display interconnect.

5. The apparatus of claim 4, the display interface comprising a display port interface or an embedded display port interface.

6. The apparatus of claim 1, the processor to:
determine whether an idle duration threshold has been met; and
determine to initiate power management functions within the panel based on a determination that the idle duration threshold has been met and that a full or partial frame update is not to be sent to the panel.

7. A method comprising:
determining whether a full or partial frame update is to be sent to a panel;
determining, by a processor in a platform coupled to a panel via a display interconnect, to initiate power management functions within the panel based on a determination that a full or partial frame update is not to be sent to the panel; and
appending, by the processing platform, a character onto a frame to be sent, by a transmitter, to the panel, the character to indicate to the panel to initiate a power management function comprising at least powering down a display interconnect link within the panel.

8. The method of claim 7, the transmitter coupled to the panel via a sideband channel, the method comprising sending, by the transmitter, a control signal to the panel via the sideband channel, the control signal to cause the panel to initiate power management functions.

9. The method of claim 7, comprising sending, by the transmitter, a control signal to the panel via an auxiliary channel within the display interconnect, the control signal to cause the panel to initiate power management functions.

10. The method of claim 7, the display interconnect comprising a display port interconnect or an embedded display port interconnect.

11. The method of claim 7, comprising:
determining whether an idle duration threshold has been met; and
determining to initiate power management functions within the panel based on a determination that the idle duration threshold has been met and that a full or partial frame update is not to be sent to the panel.

12. At least one non-transitory machine-readable storage medium comprising instructions that when executed by a processor at a platform coupled to a panel via a display interconnect, cause the processor to:
determine whether a full or a partial frame update is to be sent to the panel;
determine to initiate power management functions within a panel based on a determination that a full or partial frame update is not to be sent to the panel; and
append a character onto a frame to be sent, by a transmitter, to the panel, the character to indicate to the panel to initiate a power management function comprising at least powering down a display interconnect link within the panel.

13. The at least one non-transitory machine-readable storage medium of claim 12, comprising instructions that further cause the processor to cause the transmitter to send a control signal to the panel via a sideband channel, the control signal to cause the panel to initiate power management functions, the transmitter coupled to the panel via the sideband channel.

14. The at least one non-transitory machine-readable storage medium of claim 12, comprising instructions that further cause the processor to cause the transmitter to send a control signal to the panel via an auxiliary channel within the display interconnect, the control signal to cause the panel to initiate power management functions.

15. The at least one non-transitory machine-readable storage medium of claim 12, the display interconnect comprising a display port interconnect or an embedded display port interconnect.

16. The at least one non-transitory machine-readable storage medium of claim 12, comprising instructions that further cause the processor to:
determine whether an idle duration threshold has been met; and
determine to initiate power management functions within the panel based on a determination that the idle duration threshold has been met and that a full or partial frame update is not to be sent to the panel.

* * * * *